United States Patent [19]
Tsai

[11] Patent Number: 5,939,708
[45] Date of Patent: Aug. 17, 1999

[54] ALIGNMENT PATTERN AND ALIGNMENT METHOD FOR A SCANNING SYSTEM

[75] Inventor: Jenn-Tsair Tsai, Taoyuan, Taiwan

[73] Assignee: Mustek Systems Inc., Hsinchu, Taiwan

[21] Appl. No.: 08/927,068

[22] Filed: Sep. 10, 1997

[30] Foreign Application Priority Data

Mar. 17, 1997 [TW] Taiwan ................................ 86103318

[51] Int. Cl.$^6$ .................................................. G01B 11/00
[52] U.S. Cl. ........................ 250/208.1; 356/400; 382/317
[58] Field of Search ............................ 250/208.1, 559.44, 250/559.3, 548; 356/399, 400, 401; 382/317

[56] References Cited

U.S. PATENT DOCUMENTS

| | | | |
|---|---|---|---|
| 4,641,357 | 2/1987 | Satoh | 382/317 |
| 5,420,944 | 5/1995 | Concannon et al. | 382/317 |
| 5,786,590 | 7/1998 | Lin | 250/208.1 |

*Primary Examiner*—Edward P. Westin
*Assistant Examiner*—Thanh X. Luu
*Attorney, Agent, or Firm*—McDermott, Will & Emery

[57] ABSTRACT

An alignment pattern of the present invention includes a resolution analysis pattern that is formed on the central portion of the alignment pattern for the resolution analysis of a scanning system. A pair of horizontal alignment patterns that cosists of a black zone and a white zone are formed adjacent to the terminations of the resolution analysis pattern for horizontal and boundary alignments. The pattern arrangement of the pair horizontal alignment patterns is not only upside down but also a mirror image with each other. The black zone includes a shallow indented portion adjacent to the resolution analysis pattern in the black zone and on the border of the black zone, white zone. A white rectangular figure is exactly formed over or under the shallow indented portion in the black zone and parallel to the shallow indented portion. The area between the shallow indented portion and the white rectangular figure is used to serve as a horizontal fine alignment for the scanning system. A deep indented portion is adjacent to the shallow indented portion in the black zone and on the border of the black zone and white zone. The deep indented portion is serve as a boundary alignment pattern for boundary alignment of the scanning system. Moreover, the area among the deep indented portion, the shallow indented portion and the white rectangular figure acts as a horizontal rough alignment for the scanning system.

26 Claims, 6 Drawing Sheets

ALIGNMENT PATTERN AND ALIGNMENT METHOD FOR A SCANNING SYSTEM

FIELD OF THE INVENTION

The present invention relates to a scanning system, and more specifically, to a CCD alignment pattern for a scanning system and an alignment method for the same.

BACKGROUND OF THE INVENTION

A scanning system makes use of focusing a reflecting light beam through a photodetector to generate an image signal for further image processing. A conventional scanner system includes a light source, a mirror, and a lens set, which are used to guide the reflecting light to a charge couple device (CCD). The charge couple device is utilized to generate an image signal. A pre-processing element is used to respond an image signal and adjust dc gain of the image signal. An analogue to digital converter is used to convert adjusted image signal to a digital signal and a post-processing element to generate an image code by processing said digital signal through highlight, shadow, and Gamma correction.

Image capture is achieved by passing the document in front of a device known as a CCD. This consists of a lot of very small, individual semiconductor receptors, disposed in a linear array. The document is passed in front of the CCD and a complete image of the document linear segments individually captured from the CCD. The CCD consists of a semiconductor material which is formulated to convert incident light into an analogue electrical signal. Therefore, the alignment of the CCD is very important in the scanning system.

In practicing the scanning system, the light source is reflected from the surface of a document, then it is reflected against from the mirror and focused by a lens set. The mirror and the lens set are used to guide the light beam to a CCD. Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generate an image code by processing the digital signal through highlight, shadow, and Gamma correction.

Turning to FIG. 1, it shows a conventional alignment pattern 1. Typically, the alignment pattern 1 has three pairs of fixer 3A, 3B and 3C formed on the edges of the alignment pattern to fix the alignment pattern during fine alignment, rough alignment and resolution analysis, respectively. A fine horizontal pattern 5 is formed on the upper portion of the alignment pattern 1 to serve as a fine alignment pattern 5. A horizontal pattern 7 is formed on the central portion of the alignment pattern 1 for acting as a rough alignment pattern 7. A pair of discontinuous regions 9 are formed near the terminations of the rough alignment pattern 7 to use as boundary alignment patterns 9. Further, a resolution analysis pattern 11 is formed on the lower portion of the alignment pattern 1. The resolution analysis pattern 11 is used to analyze the resolution of the scanning system. Typically, a plurality of fine lines 13 are repeatedly, vertically formed in the resolution analysis pattern 11 for analyzing the resolution of the scanning system. The distances between the fine lines 13 are equal.

Generally speaking, there are three steps to align the CCD of the scanning system known as a horizontal alignment, a boundary alignment and resolution analysis, respectively. Unfortunately, it is not very convenient for operating an alignment procedure by using the alignment pattern 1. It is because that the fixers 3A, 3B and 3C are respectively served for different function. In other word, the fixers of the alignment pattern 1 have to be frequently changed and adjusted for different CCD alignment procedure. Further, the operator does not know how to adjust the CCD to a correct area via an oscilloscope by using the pattern 1.

SUMMARY OF THE INVENTION

An alignment pattern of the present invention includes a resolution analysis pattern that is formed on the central portion of the alignment pattern for the resolution analysis of a scanning system. The resolution analysis consists of a plurality of fine lines. Further, all of the distances between the fine lines are equal. A pair of horizontal alignment patterns that consists of a black zone and a white zone are formed adjacent to the terminations of the resolution analysis pattern for horizontal and boundary alignments. In the preferred embodiment, the pattern arrangement of the pair horizontal alignment patterns is not only upside down but also a mirror image with each other.

The black zone includes a shallow indented portion adjacent to the resolution analysis pattern in the black zone and on the border of the black zone, white zone. A white rectangular figure is exactly formed over or under the shallow indented portion in the black zone and parallel to the shallow indented portion. The area between the shallow indented portion and the white rectangular figure is used to serve as a horizontal fine alignment for the scanning system. A deep indented portion is adjacent to the shallow indented portion in the black zone and on the border of the black zone and white zone. The deep indented portion serves as a boundary alignment pattern for boundary alignment of the scanning system. Moreover, the area among the deep indented portion, the shallow indented portion and the white rectangular figure acts as a horizontal rough alignment for the scanning system.

The alignment method of the present invention will be described as follows. First, the lens set is set between the alignment pattern and the CCD. The CCD is then adjusted to make sure that the CCD can detect the light reflected from the alignment pattern. The next step of the alignment method is rough alignment of the lens set. Next, the adjusters are used to adjust the CCD for CCD rough alignment. The step will generate a first waveform shown on the oscilloscope due to the alignment pattern.

Subsequently, the lens set is moved along the axis of the lens set for fine alignment of the lens set. Next, the CCD is also moved and rotated for fine alignment of the CCD. The step will generate a second waveform shown on oscilloscope due to the alignment pattern. It implies that the alignment procedure is complete.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
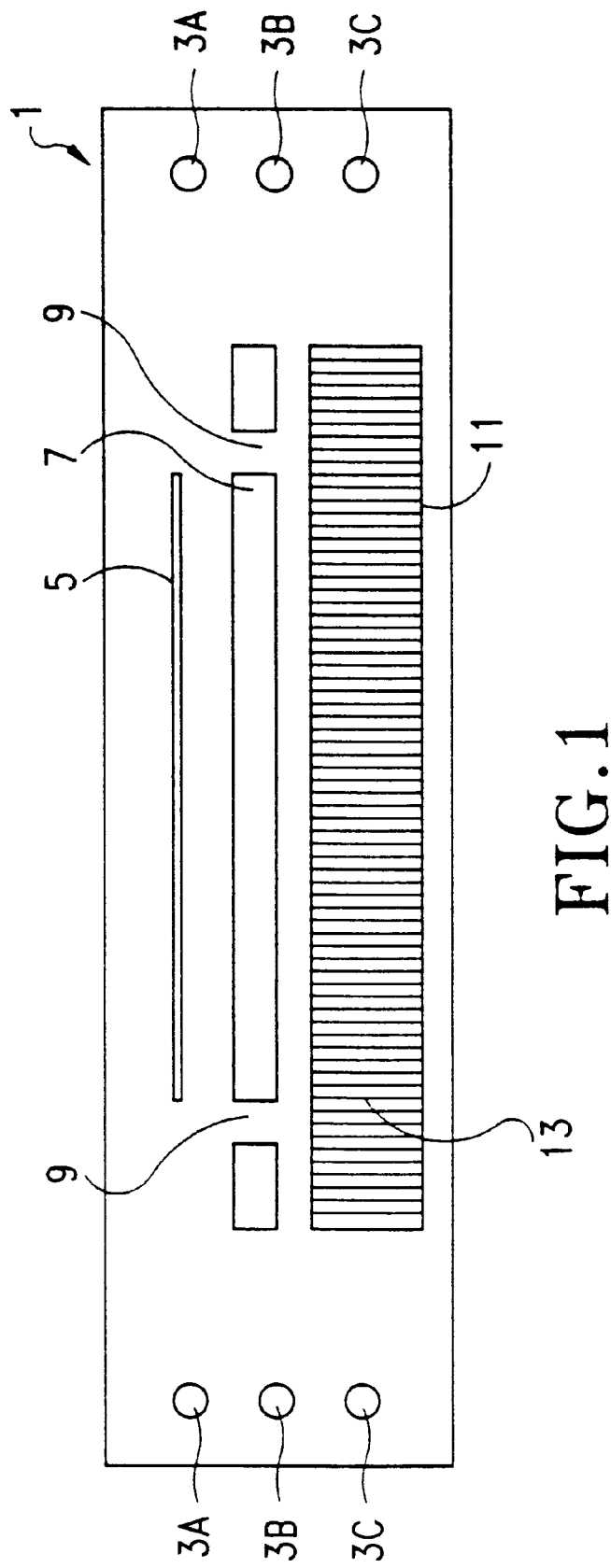
FIG. 1 is a conventional alignment pattern.
Figure 2:
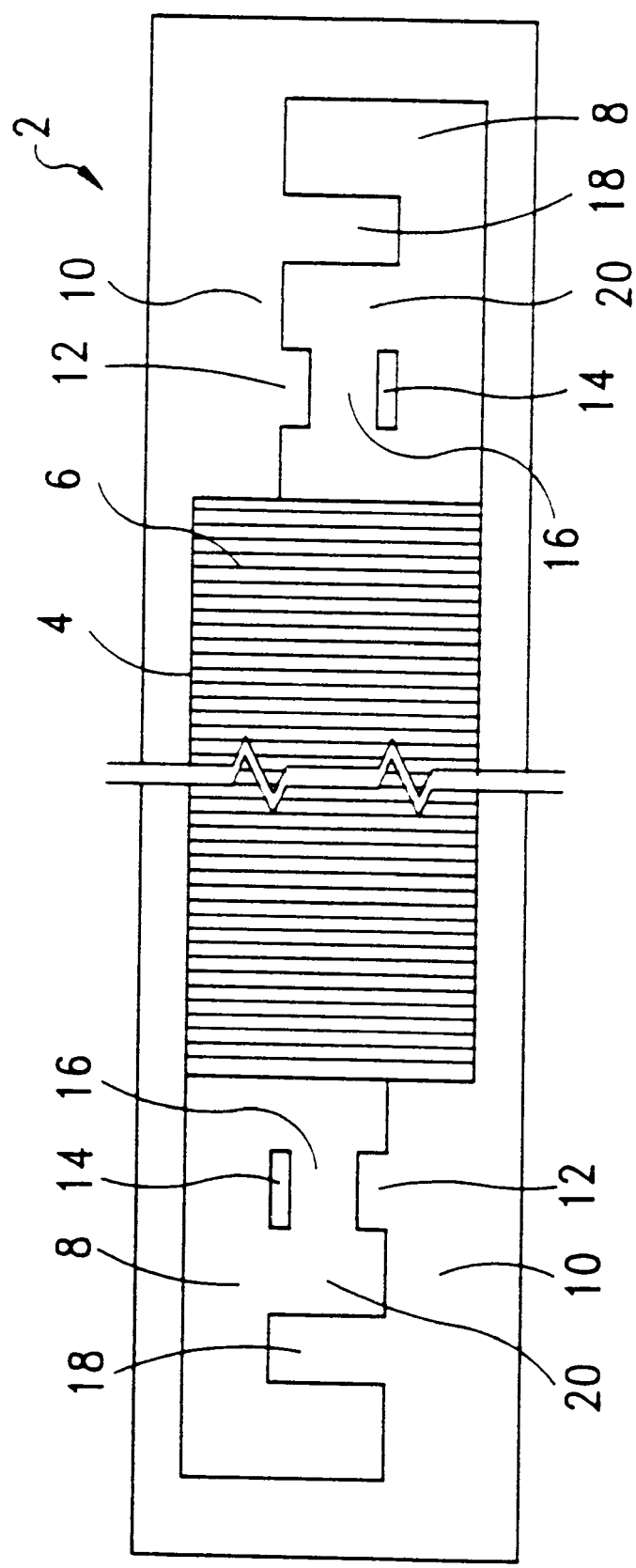
FIG. 2 is an alignment pattern of the present invention.

Turning to FIG. 2, an alignment pattern 2 of the present invention includes a resolution analysis pattern 4 that is formed on the central portion of the alignment pattern 2 for the resolution analysis of a scanning system. The resolution analysis pattern 4 is preferably a rectangular region that consists of a plurality of fine lines 6. The fine lines 6 are repeatedly, vertically formed in the rectangular region for analyzing the resolution of the scanning system. Alternatively, the fine lines 6 could be a plurality of oblique lines. Further, all of the distances between the fine lines 6 are equal. The distances between the lines 6 are dependent on how high of the resolution of the system that the designer desire. A pair of horizontal alignment patterns that consists of a first color zone 8 and a second color zone 10 are formed adjacent to the terminations of the resolution analysis pattern 4 for horizontal and boundary alignments. The color of the first color zone 8 is different from the one of the second color zone 10. Any suitable color can be used for the first color zone 8 and the second color zone 10. Preferably, the color of the first color zone 8 is black, while the one of the second color zone 10 is white. In the preferred embodiment, the pattern arrangement of the pair horizontal alignment patterns is not only upside down but also a mirror image with each other.

The black zone 8 includes a shallow indented portion 12 adjacent to the resolution analysis pattern 4 in the black zone 8 and on the border of the black zone 8, white zone 10 (the color of the shallow indented portion 12 is white). A white rectangular FIG. 14 is exactly formed over or under the shallow indented portion 12 in the black zone 8 and parallel to the shallow indented portion 12. The area 16 between the shallow indented portion 12 and the white rectangular FIG. 14 is used to serve as a horizontal fine alignment for the scanning system. In the preferred embodiment, the depth and the wide of the shallow indented portion 12 are respectively 0.8 mm and 2 mm. The length and the wide of the white rectangular FIG. 14 are respectively 2 mm and 0.8 mm. Further, the shallow indented portion 12 and the white rectangular FIG. 14 can be utilized to judge how to adjust the CCD to a suitable position. This will be described more detail later. A deep indented portion 18 is formed close to the shallow indented portion 12 in the black zone 8 (the deep indented portion 18 is white color) and on the border of the black zone 8 and white zone 10. Preferably, the depth and the wide of the deep indented portion 12 are respectively 1.8 mm and 2 mm. The deep indented portion 18 serves as a boundary alignment pattern for boundary alignment of the scanning system. Moreover, The area 20 among the deep indented portion 18, the shallow indented portion 12 and the white rectangular FIG. 14 acts as a horizontal rough alignment for the scanning system.

FIG. 3A to FIG. 3H shown a way to practice the alignment procedure of the scanning system by using the alignment pattern 2 and an oscilloscope. Typically, the alignment pattern 2 is set at the document region. By using the oscilloscope to show variety waveforms (FIG. 3B to FIG. 3H) in accordance with the light scanning on the different zones (represent by marked lines) of the alignment pattern 2, then reflecting through a photodetector. The feature of the present invention is that operator can judge how to adjust the CCD and lens set for alignment by using the waveform shown on the oscilloscope. Namely, each waveform (FIG. 3B to FIG. 3H) is according to a trace of the light that scans on alignment pattern 2. Therefore, the operator can conclude that how does the light scan on the alignment pattern 2 using the waveform shown on the oscilloscope. The amplitude 'L' of each waveform (FIG. 3B to FIG. 3H) represents the light scanning on the white area. Contrarily, the amplitude of each waveform is denoted by 'H' while the light scans on the black area. Alternatively, the meanings of the amplitudes "L", "H" may be opposite depending on the test circuit design.

If the pattern arrangement of the horizontal alignment patterns is not as above described, then the operator can not distinguish the different from the following cases. For example, the waveform 42 (FIG. 3C) represents the light that scans on the zone (FIG. 3A, marked by 42) of the alignment pattern 2. The waveform 46 (FIG. 3F) represents the light that scans on the zone (FIG. 3A, marked by 46) of the alignment pattern 2. Supposing the arrangement of the horizontal alignment patterns 8 is only one color region instead of two color regions, the operator can not tell the difference between the waveform 42 and the waveform 46. Fortunately, the horizontal alignment patterns of the present invention is divided into two color zones. The waveform 42 is opposite to the waveform 46 so that the operator can tell apart them easily.

Figure 3A:
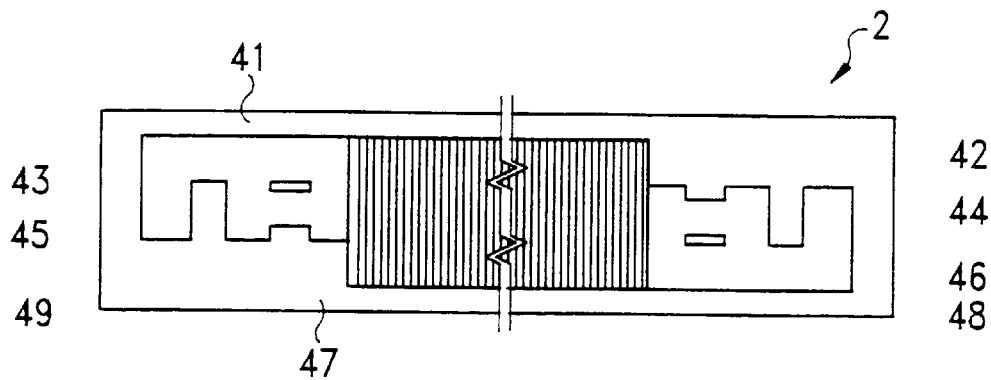
FIG. 3B to FIG. 3H show waveforms in accordance with the light scanning on the different zones of the alignment pattern.
Figure 3B:
Figure 3C:
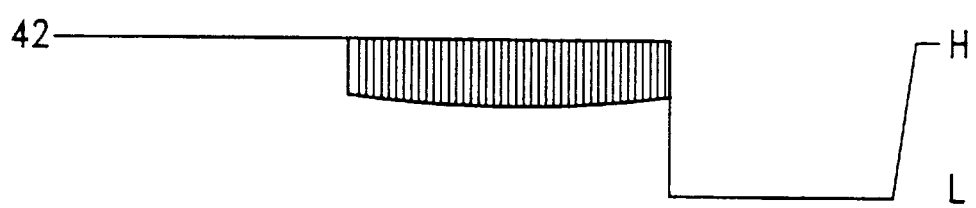
Figure 3D:
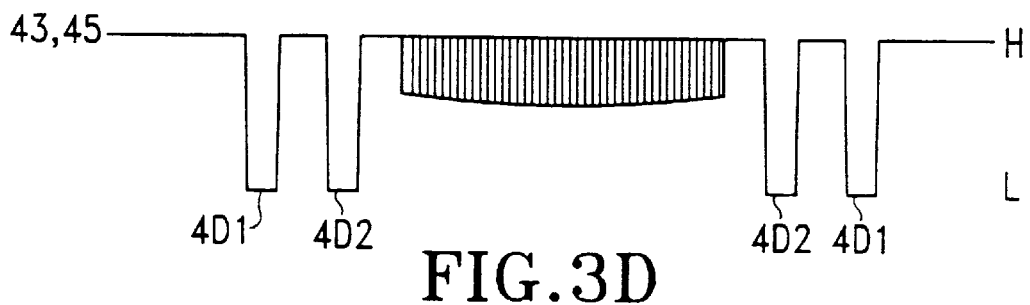

Yet another example, referring to FIG. 3D, it is a waveform that represents the light that scans on the zone (FIG. 3A, marked by 43 or 45) of the alignment pattern 2. The light scans from left through the areas of the zone 18, the zone 20, the zone 14, the resolution analysis pattern 4, the zone 14 the zone 20 and the zone 18. Therefore, the variation of the amplitude of waveform is "H-L-H-L-H-resolution pattern-H-L-H-L-H". Thus, the operator can immediately tell apart what kind of the shift of the CCD.

The advantages of the present invention are:

(1) The operator can align the boundary, resolution and horizontal alignments of the scanning system, simultaneously. (2) The operator can judge how to move the CCD and lens set using the waveform shown on the oscilloscope to a correct area. (3) The operator does not need to change the alignment position, frequently.

Figure 4:
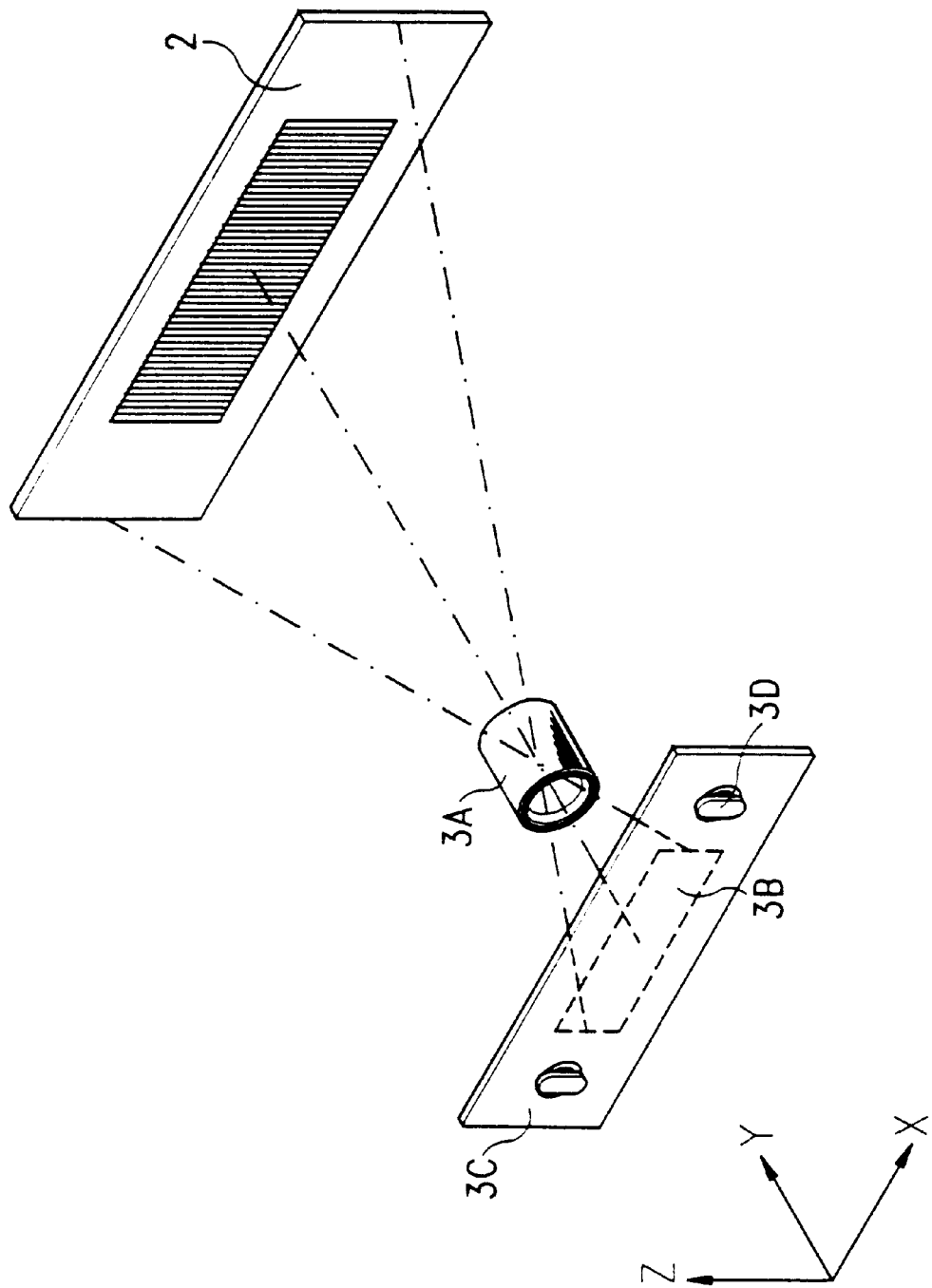
FIG. 4 is an alignment method in accordance with the present invention.

Turning to FIG. 4, it is a schematic diagram of an arrangement of the alignment method according to the present invention. A lens set 3A is set between a CCD 3B and the alignment pattern 2. Typically, the alignment pattern 2 is set on the area where is to locate a scanned abject (document). The CCD 3B is set on a PCBA 3C. Adjusters 3D are respectively formed on the terminations of the PCBA 3C for adjusting the CCD 3B.

The alignment method of the present invention will be described as follows. First, the lens set 3A is set between the alignment pattern 2 and the CCD 3B. The CCD 3B is then adjusted to make sure that the CCD 3B can detect the light reflected from the alignment pattern 2.

Still referring to FIG. 4, the next step of the alignment method is rough alignment of the lens set 3A. In the step, the lens set 3A is moved along a Y axis to make sure the intensity of the waveform shown on the oscilloscope is the highest. The Y axis is defined the direction that is vertical to the surface of the alignment pattern 2. The alignment pattern 2 is typically a rectangular shape. Thus, a X and a Z axises are defined the directions along the two adjacent sides of the alignment pattern 2. Further, the X and a Z axises are respectively vertical to the Y axis. Next, the adjusters 3D are used to adjust the CCD 3B for CCD 3B rough alignment. The CCD 3B can be moved along the Z axis or X axis. Also, the CCD 3B can be rotated by using the Y axis as a rotation axis. The step will not be completed until the waveform shown on the oscilloscope is as shown in FIG. 3D. It can be seen in FIG. 3D, the waveform 43, 45 has a pair of valleys 4D1 and a pair of valleys 4D2. It means that the light scanning on the pattern 2 is close to correct area. Namely, the CCD 3B can detect the area between the left boundary and right boundary of the alignment pattern 2. Further, the CCD is almost horizontal.

Figure 3E:
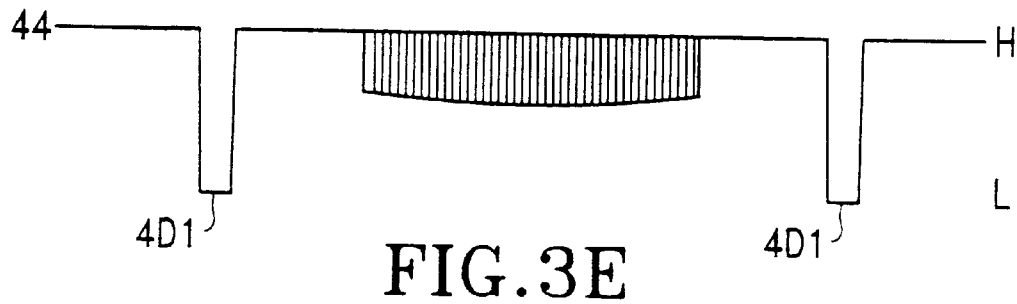
Figure 3F:
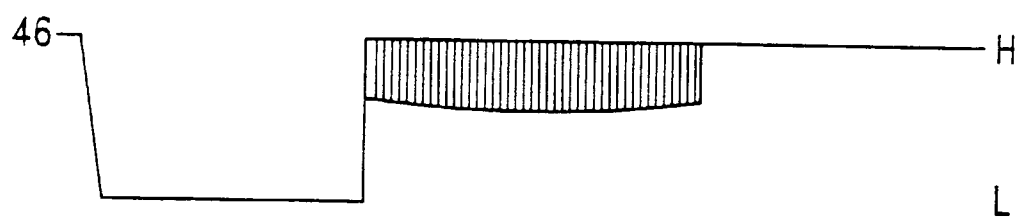
Figure 3G:
Figure 3H:
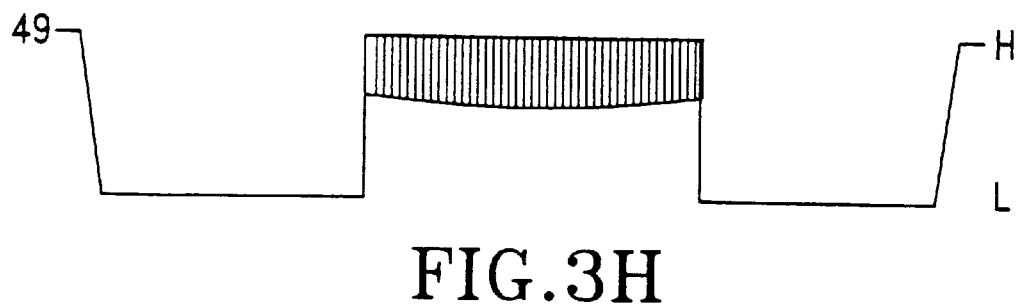

Subsequently, the lens set 3A is moved along the Y axis again for fine alignment of the lens set 3A. Similarly, the intensity of the waveform shown on the oscilloscope must be the highest. Next, the CCD 3B can be moved along the Z axis or X axis. Further, the CCD 3B can be rotated by using the Y axis as a rotation axis for fine alignment of the CCD 3B. The CCD 3B is located at the exact area while the valleys 4D2 are vanished as shown in FIG. 3E. It implies that the area between the left boundary, right boundary of the alignment pattern 2 can be detected by the CCD 3B. In addition, the CCD 3B is horizontal.

Figure 5:
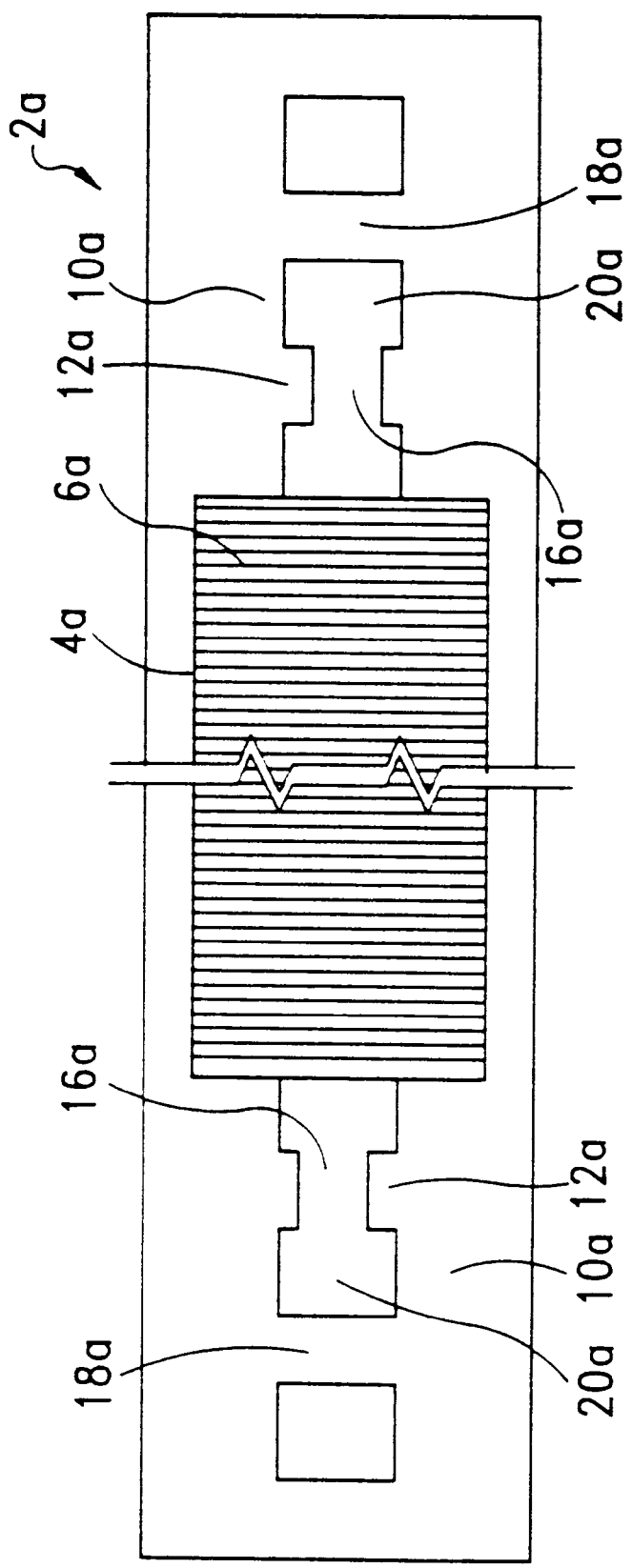
FIG. 5 is another embodiment of alignment pattern of the present invention.

FIG. 5 shows a second embodiment of the present invention. An alignment pattern 2a of the present invention includes a resolution analysis pattern 4a that is formed on the central portion of the alignment pattern 2a for the resolution analysis of a scanning system. Similarly, the resolution analysis pattern 4a is preferably a rectangular region that consists of a plurality of fine lines 6a. Similarly, the fine lines 6a are repeatedly, vertically formed in the rectangular region for analyzing the resolution of the scanning system. Further, all of the distances between the fine lines 6 are equal. The lines 6a can be vertical lines or oblique lines. A pair of horizontal alignment patterns that consists of a black zone and a white zone 10a are formed adjacent to the terminations of the resolution analysis pattern 4a for horizontal and boundary alignments.

The black zone includes a "H" shape pattern and a rectangular pattern 8a. The "H" shape pattern is adjacent to the resolution analysis pattern 4a. The "H" shape pattern consists of a pair of vertical portions 20a and a horizontal portion 16a. The horizontal portion 16a is connected between the pair of the vertical portion 20a. A plurality of shallow indented portion 12a are formed in the present invention. A horizontal portion 16a of the "H" shape pattern (the area between two shallow indented portion 12a) is used for serving as a horizontal fine alignment for the scanning system. The vertical portion of the "H" shape 20a acts as a horizontal rough alignment for the scanning system.

A black rectangular pattern 8a is formed close to the "H" shape pattern. The area 18a between the vertical portion of the "H" shape 20a and the rectangular pattern 8a is used to serve as a boundary alignment pattern for boundary alignment of the scanning system.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An alignment pattern for a scanning system having a CCD and a lens set, said alignment pattern comprising:

a resolution analysis pattern formed on the central portion of said alignment pattern for analyzing resolution of said lens set, said resolution analysis pattern being a horizontal rectangular area, said resolution analysis pattern having a plurality of lines repeatedly formed in said horizontal rectangular area;

a pair of boundary and horizontal alignment patterns formed adjacent to terminations of said resolution analysis pattern for boundary and horizontal alignment of said CCD, said boundary and horizontal alignment pattern consisting of a first color zone and a second color zone, the pattern arrangement of said pair of boundary and horizontal alignment patterns being not only upside down but also a mirror image with each other, said first color zone comprising:

a first horizontal alignment pattern formed in said first color zone for horizontal respectively fine alignment of said CCD;

a second horizontal alignment pattern formed in said first color zone for horizontal respectively rough alignment of said CCD; and a boundary alignment pattern formed in said first color zone on the border of said first color zone and said second color zone for boundary alignment of said CCD.

2. The alignment pattern of claim 1, wherein said first color zone further comprising:

a first indented portion formed on the border of said first color zone and said second color zone, being adjacent to said resolution analysis pattern; and a horizontal rectangular figure formed in said first color zone, being parallel to said first indented portion, the area between said first indented portion and said horizontal rectangular figure being served as said horizontal fine alignment pattern.

3. The alignment pattern of claim 2, wherein the color of said horizontal rectangular figure being the same with said second color zone.

4. The alignment pattern of claim 2, wherein said boundary alignment pattern is a second indented portion.

5. The alignment pattern of claim 4, wherein said horizontal rough alignment pattern is a area among said first indented portion, said second indented portion and said horizontal rectangular figure.

6. The alignment pattern of claim 4, wherein said first indented portion having a first depth, said second indented portion having a second depth, said second depth is deeper than said second depth.

7. The alignment pattern of claim 1, wherein said lines in said horizontal rectangular area are vertical lines.

8. The alignment pattern of claim 1, wherein said lines in said horizontal rectangular area are oblique lines.

9. The alignment pattern of claim 1, wherein said first color zone is black color.

10. The alignment pattern of claim 1, wherein said second color zone is white color.

11. The alignment pattern of claim 2, wherein said first color zone is black color.

12. The alignment pattern of claim 2, wherein said second color zone is white color.

13. An alignment pattern for a scanning system having a CCD and a lens set, said alignment pattern comprising:

a resolution analysis pattern formed on the central portion of said alignment pattern for analyzing resolution of said lens set, said resolution analysis pattern being a horizontal rectangular area, said resolution analysis pattern having a plurality of lines repeatedly formed in said horizontal rectangular area;

a pair of boundary and horizontal alignment patterns formed adjacent to terminations of said resolution analysis pattern for boundary and horizontal alignment of said CCD, said boundary and horizontal alignment pattern consisting of a first color zone and a second color zone, said first color zone comprising a first horizontal alignment pattern formed in said first color zone for horizontal respectively fine alignment of said CCD, a second horizontal alignment pattern formed in said first color zone for horizontal respectively rough alignment of said CCD and a boundary alignment pattern formed in said second color zone for boundary alignment of said CCD.

14. The alignment pattern of claim 13, wherein said first color zone further comprising:
- a "H" shape pattern formed adjacent to said resolution analysis pattern, said "H" shape pattern consisting of a pair of vertical portions and a horizontal portion, said horizontal portion being connected between said vertical portion; and
- a rectangular pattern formed close to said "H" shape pattern, the area between said "H" shape pattern and said rectangular pattern being served as said boundary alignment pattern.

15. The alignment pattern of claim 13, wherein said rough alignment pattern is a vertical portion of said "H" shape pattern.

16. The alignment pattern of claim 13, wherein said fine alignment pattern is a horizontal portion of said "H" shape pattern.

17. The alignment pattern of claim 13, wherein said lines formed in said horizontal rectangular area are vertical lines.

18. The alignment pattern of claim 13, wherein said lines formed in said horizontal rectangular area are oblique lines.

19. The alignment pattern of claim 13, wherein said first color zone is black color.

20. The alignment pattern of claim 13, wherein said second color zone is white color.

21. The alignment pattern of claim 13, wherein said first color zone is black color.

22. The alignment pattern of claim 13, wherein said second color zone is white color.

23. An alignment method for a scanning system including a CCD and a lens set, by using an alignment pattern, said alignment pattern comprises a resolution analysis pattern formed on said alignment pattern, a horizontal and boundary alignment patterns formed on said alignment pattern adjacent to said resolution analysis pattern, wherein said horizontal and boundary alignment patterns consist of a first color zone and a second color zone, wherein said horizontal and boundary alignment pattern comprises a first horizontal alignment pattern for respectively rough alignment, a second horizontal alignment pattern for respectively fine alignment, and a boundary alignment pattern, a first waveform being generated while light scanning on said first horizontal alignment pattern, a second waveform being generated while said light scanning on said second horizontal alignment pattern, said alignment method comprising:
- setting said lens set between said CCD and said alignment pattern;
- adjusting said CCD to make sure that said CCD detects a light reflected from said alignment pattern;
- adjusting said lens set for alignment of said lens set to generate a first respectively high intensity of a resolution analysis waveform on an oscilloscope;
- adjusting said CCD for alignment of said CCD to generate said first waveform on said oscilloscope;
- adjusting said lens set for alignment of said lens set to generate a second respectively highest intensity of said resolution analysis waveform on said oscilloscope; and
- adjusting said CCD for alignment of said CCD to generate said second waveform on said oscilloscope.

24. The alignment method of claim 23, wherein said horizontal and boundary alignment patterns are not only upside down but also a mirror image with each other.

25. The alignment pattern of claim 23, wherein said first color zone is black color.

26. The alignment pattern of claim 23, wherein said second color zone is white color.

* * * * *